United States Patent
Liang et al.

(10) Patent No.: US 10,707,713 B2
(45) Date of Patent: Jul. 7, 2020

(54) BALANCED HAIRPIN WINDING ELECTRIC MACHINE

(71) Applicant: Ford Global Technologies, LLC, Dearborn, MI (US)

(72) Inventors: Feng Liang, Troy, MI (US); Franco Leonardi, Dearborn Heights, MI (US); Becky Sue Morris, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 192 days.

(21) Appl. No.: 15/871,615

(22) Filed: Jan. 15, 2018

(65) Prior Publication Data

US 2019/0222078 A1 Jul. 18, 2019

(51) Int. Cl.
*H02K 3/12* (2006.01)
*H02K 15/00* (2006.01)
*H02K 3/28* (2006.01)
*H02K 15/04* (2006.01)
*H02K 15/06* (2006.01)

(52) U.S. Cl.
CPC .................. *H02K 3/12* (2013.01); *H02K 3/28* (2013.01); *H02K 15/0081* (2013.01); *H02K 15/0414* (2013.01); *H02K 15/064* (2013.01)

(58) Field of Classification Search
CPC ........ H02K 3/12; H02K 3/28; H02K 15/0081; H02K 15/0414; H02K 15/064
USPC .......................................................... 310/198
See application file for complete search history.

(56) References Cited

U.S. PATENT DOCUMENTS

| 7,348,705 | B2 | 3/2008 | Cai et al. |
| 7,622,843 | B2 | 11/2009 | Cai |
| 7,923,885 | B2 | 4/2011 | Ogawa et al. |
| 9,252,645 | B2 | 2/2016 | Crane |
| 9,379,586 | B2 | 6/2016 | Rahman et al. |
| 9,520,753 | B2 | 12/2016 | Rahman et al. |
| 2003/0214196 | A1 | 11/2003 | Cai et al. |
| 2005/0206263 | A1* | 9/2005 | Cai .......................... H02K 3/12 310/198 |
| 2008/0042508 | A1* | 2/2008 | Cai .......................... H02K 3/28 310/198 |
| 2013/0076175 | A1 | 3/2013 | Turnbull et al. |
| 2014/0077636 | A1 | 3/2014 | Jung |
| 2014/0184011 | A1 | 7/2014 | Kaimori et al. |
| 2016/0164359 | A1 | 6/2016 | Han et al. |
| 2016/0285334 | A1 | 9/2016 | Turnbull et al. |
| 2018/0175690 | A1 | 6/2018 | Lange et al. |

FOREIGN PATENT DOCUMENTS

| KR | 20140064230 A | 5/2014 |
| WO | 2017168971 A1 | 10/2017 |

* cited by examiner

*Primary Examiner* — Terrance L Kenerly
(74) *Attorney, Agent, or Firm* — David Kelley; Brooks Kushman P.C.

(57) ABSTRACT

An electric machine includes a stator core defining slots having radial layers that each include adjacent first and second pin positions. Pins are disposed in corresponding ones of the slots and are interconnected to form a winding path. The path occupies the first and second positions of each layer, and, for each of the corresponding slots, the pins are in a same layer.

17 Claims, 9 Drawing Sheets

BALANCED HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator defining slots grouped into poles, and a plurality of hairpins interconnected with select ones of the hairpins to form a plurality of winding paths corresponding to one of three phases of the electric machine and being configured to carry a same amount current. Each of the paths is disposed in corresponding ones of the slots. The slots include radial layers of the hairpins that each have at least radially adjacent inner and outer hairpins positions. For each of the poles, each of the paths occupies the inner and outer hairpin positions of each of the layers once.

According to another embodiment, an electric machine includes a stator having slots defining a plurality of radial layers each having adjacent radial positions. Pins are interconnected and are disposed in an adjacent set of the slots to form winding paths each corresponding to a phase of the electric machine that occupies, for each of the slots of the set, all of the adjacent radial positions for a different one of the radial layers.

According to yet another embodiment, a stator for an electric machine includes a stator core defining slots circumferentially arranged and extending radially outward from an inner diameter of the core. A plurality of hairpins are interconnected with select ones of the hairpins and are disposed in corresponding ones of the slots to form a plurality of winding paths each corresponding to one of three phases of the electric machine and configured to pass a same amount of current therethrough. The slots include radial layers of the hairpins that each have at least adjacent inner and outer hairpins positions, and wherein each of the paths occupies the inner and outer positions of each layer of the corresponding ones of the slots, and, for each of the corresponding slots, the hairpins are in a same layer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
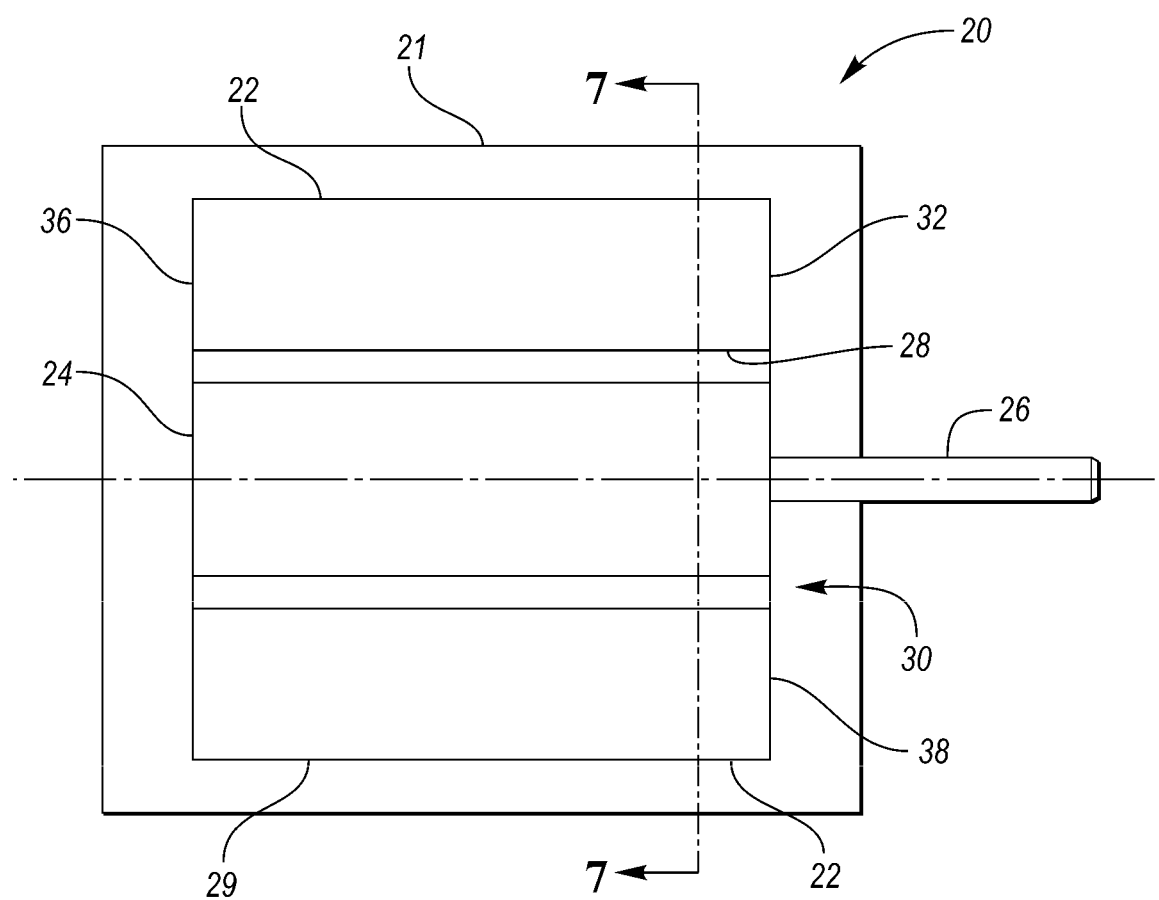
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, a synchronous machine, or the like. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine. For example, a typical traction battery may provide a DC voltage while the electric machine 20 may require a three-phase alternating current (AC) voltage to function. The power electronics module may include an inverter that converts the DC voltage to a three-phase AC voltage as required by the electric machine 20. In a regenerative mode, the power electronics module may convert the three-phase AC voltage from the electric machine 20 acting as generators to the DC voltage required by the traction battery.

Figure 2:
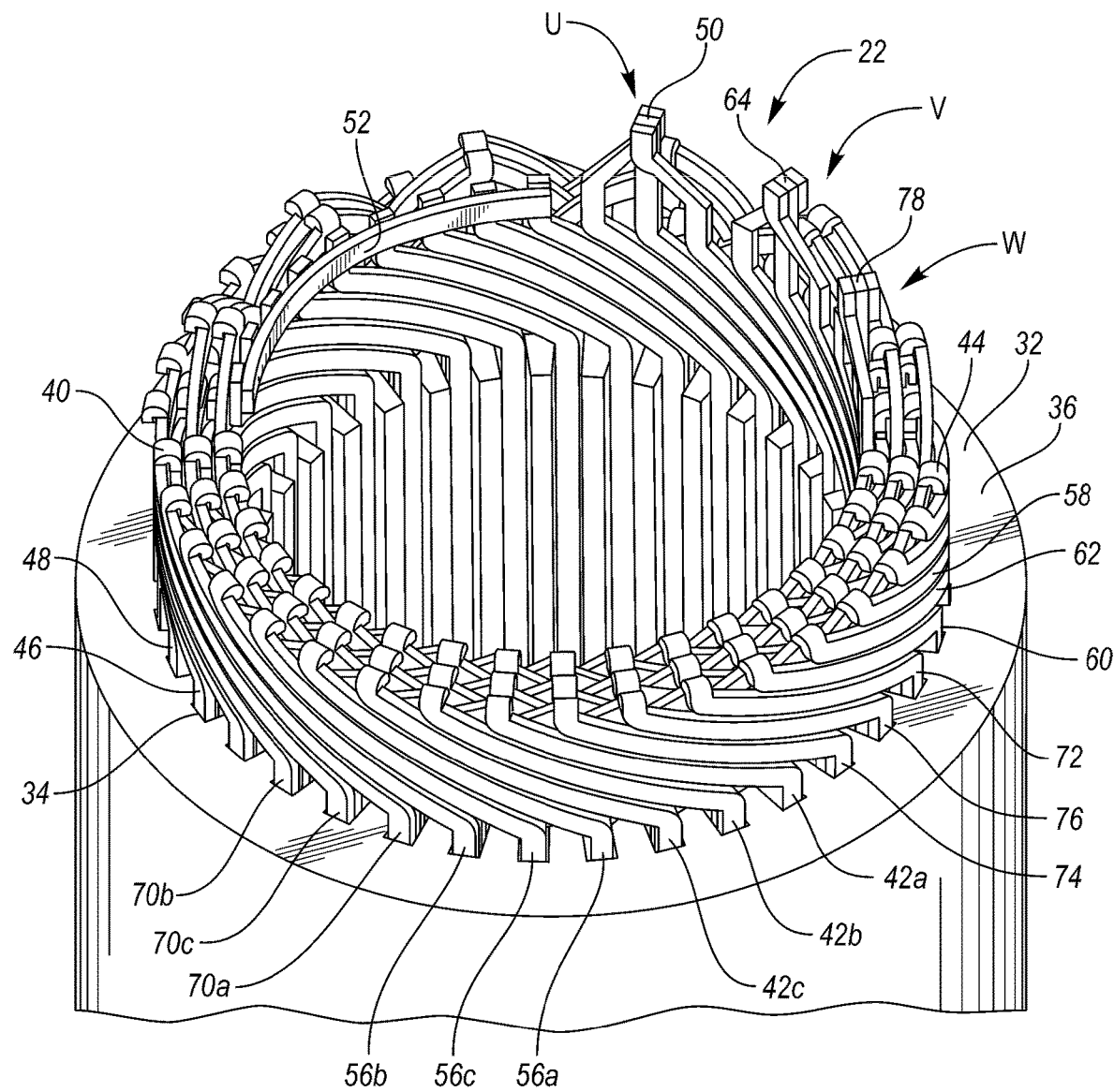
FIG. 2 is a perspective view of one end of a stator of the electric machine showing all winding paths.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The rotor 24 is supported for rotation within the hole 30. The rotor 24 may include windings or permanent magnets that interact with winding of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle.

The stator core 32 defines slots 34 circumferentially arranged around the core 32 and extend outward from the inner diameter 28. The slots 34 may be equally spaced around the circumference and extend axially from a first end 36 of the core 32 to a second end 38. In the illustrated embodiment, the core 32 defines thirty-six slots and has four poles, but the core 32 may include more or fewer slots and/or poles in other embodiments. For example, the core 32 may define seventy-two slots and have eight poles.

The electric machine 20 may include hairpin windings 40 placed in the slots 34 of the core 32. Hairpin windings are an emerging technology that improves efficiency for electric machines used in vehicles. The hairpin windings 40 improve efficiency by providing a greater number of stator conductors to reduce resistance of the winding 40 without encroaching into space reserved for the electrical steel and the magnetic flux path. The hairpin windings 40 may be wave windings in which the windings 40 weave pole to pole in a wave-like pattern.

One challenge with hairpin winding is matching the electric machine design to the desired torque-speed curve. An essential step in designing an electric machine is selecting the phase turn number so that the torque-speed curve covers all required operating points. For conventional stranded windings made of flexible thin copper conductors connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape in order to make the connection possible. This limits the number and size of the conductors that can be fit in a single slot. Another challenge is creating parallel circuits that are balanced (i.e., not causing large circulating currents in the loop formed by the parallel circuits due do dissymmetry) and have reasonably complex connections.

The electric machine 20 solves these and other problems. The electric machine 20 may be a three-phase machine in which the hairpin windings 40 are arranged to have a U phase, a V phase, and a W phase. Each phase includes associated hairpins conductors (also known as pins, hairpins, or bar conductors) arranged in three parallel paths of windings.

The U phase may include a plurality of pins 42a, a plurality of pins 42b, and a plurality of pins 42c. The pins 42a are connected to each other to form a first path 44, the pins 42b are connected to each other to form a second path 46, and the pins 42c are connected to each other to form a third path 48. Each of the paths includes a first end that starts at the terminal 50 and a second end that ends at the neutral connection 52. The paths 44, 46, 48 are connected to each other at the terminal 50 and at the neutral connection 52, but are otherwise electrically isolated from each other. Each of the paths encircles the stator core 32 by weaving in and out of corresponding ones of the slots 34. Each of the paths may generally extend around the core approximately three times in the clockwise direction and three times in the counterclockwise direction. In the illustrated embodiment, each of the paths includes thirteen pins that are generally interconnected end-to-end to form a continuous conductor between the terminal 50 and the neutral connection 52.

The V phase may include a plurality of pins 56a, 56b, and 56c that are interconnected to form a first path 58, a second path 60, and a third path 62, respectively. Each of the paths includes a first end that starts at a terminal 64 and a second end that ends at a neutral connection 52. The paths 58, 60, 62 are connected to each other at the terminal 64 and at the neutral connection 52 but are otherwise electrically isolated from each other. Each of the paths encircles the stator core 32 by weaving in and out of select ones of the slots 34. Each of the paths may generally extend around the core 32 approximately three times in the clockwise direction and three times in the counterclockwise direction. In the illustrated embodiment, each of the paths includes thirteen pins that are generally interconnected end-to-end to form a continuous conductor between the terminal 64 and the neutral connection 52.

The W phase may include a plurality of pins 70a, 70b, and 70c that are interconnected to form a first path 72, a second path 74, and a third path 76, respectively. Each of the paths includes a first end that starts at a terminal 78 and a second end that ends at a neutral connection 52. While illustrated with three neutral connection (one for each phase), in other embodiments, a single neutral connection could be used to connect all nine paths. The paths 72, 74, 76 are connected to each other at the terminal 78 and at the neutral connection 52 but are otherwise electrically isolated from each other. Each of the paths encircles the stator core 32 by weaving in and out of select ones of the slots 34. Each of the paths may generally extend around the core 32 approximately three times in the clockwise direction and three times in the counterclockwise direction. In the illustrated embodiment, each of the paths includes thirteen pins that are generally interconnected end-to-end to form a continuous conductor between the terminal 78 and the neutral connection 52. The terminals 50, 64, 78 are connected to the inverter and receive voltage from the inverter, which creates torque-producing current in the winding paths causing the rotor 24 to rotate within the stator 22.

Figure 3:
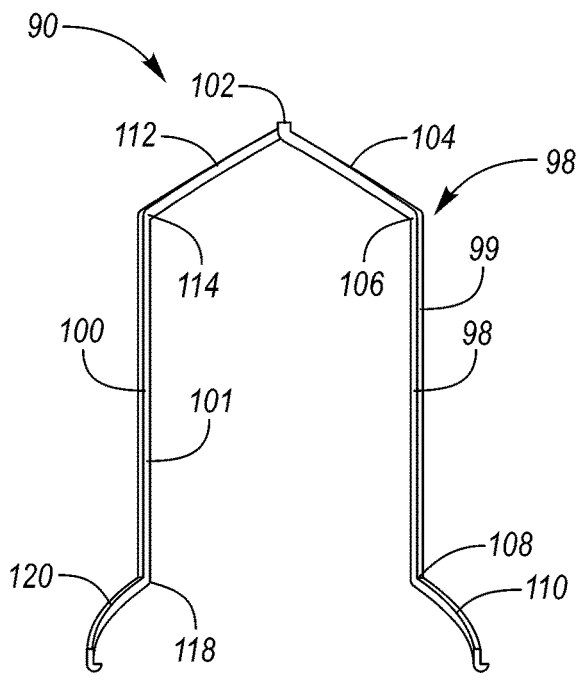
FIG. 3 is a front view of a regular pin.

Referring to FIG. 3, the pins of each of the paths may include one or more types of pin such as a regular pin 90, a turnaround pin 92, a carryover pin 94, and a short-pitch pin 96. Each of the paths may also include a terminal pin and a neutral-connection pin that are one half of a regular pin 90. Each of the paths may not include all types of pins, however, each path may include at least four of the six types of pins. Each of the paths may include more regular pins 90 than the other types of pins. Each of the paths may also include at least one short-pitch pin 96 and one turnaround pin 92. For example, the pins 42a of the first path 44 may be comprised of six regular pins 90, four short-pitch pins 96, one turnaround pin 92, one terminal pin, and one neutral-connection pin; and the pins 42b and the pins 42c of the second and third paths, respectively, may be the same with each comprised of six regular pins 90, two short-pitch pins 96, two carryover pins 94, one turnaround pin 92, one terminal pin, and one neutral-connection pin The regular pins 90 may include a first leg 98 joined to a second leg 100 at a vertex 102. The vertex 102 may radially offset the legs. The vertex may be formed by a twist that radially offset the legs by the dimension of one pin along the radial direction. The pins 90 may be formed from a single piece of metal such as copper, aluminum, silver, or any other electrically conductive material. The first leg 98 is disposed in one of the slots 34 and the second leg 100 is disposed in another of the slots 34 that is spaced apart by a span of slots. The regular pins 90 may have a span of slots that is equal to the number of slots per pole, which is nine slots in the illustrated embodiment. Thus, if the first leg 98 was in slot 1, the second leg 100 would be in slot 10. The first leg 98 includes a straight portion 99 that is the portion of the leg 98 disposed within the slot 34 and a first angled portion 104 that extends between the vertex 102 and the straight portion 99. The straight portion 99 and the angled portion 104 are joined at a first bend 106. The first leg 98 also includes a weld segment 110 that is angled outward at a second bend 108. The second leg 100 includes a straight portion 101 that is the portion of the leg 100 disposed within the slot 34 and a first angled portion 112 that extends between the vertex 102 and the straight portion 101. The straight portion 101 and the angled portion 112 are joined at a first bend 114. The second leg 100 also includes a weld segment 120 that is angled outward at a second bend 118. The weld segments 110, 120 angle in opposite directions to extend away from the pin 90 to connect with other pins of the path.

The regular pin 90 may be fabricated by first forming the vertex 102, the first angled portions 104, 112, and two extended straight portions. Then, the pin 90 is installed into the stator 22 by inserting the extended straight portions into the slots 34 of the stator 22. The second bends 108, 118 and the weld segments 110, 120 are formed after the pin 90 is installed through the slots by bending the extended legs as desired.

Figure 4:
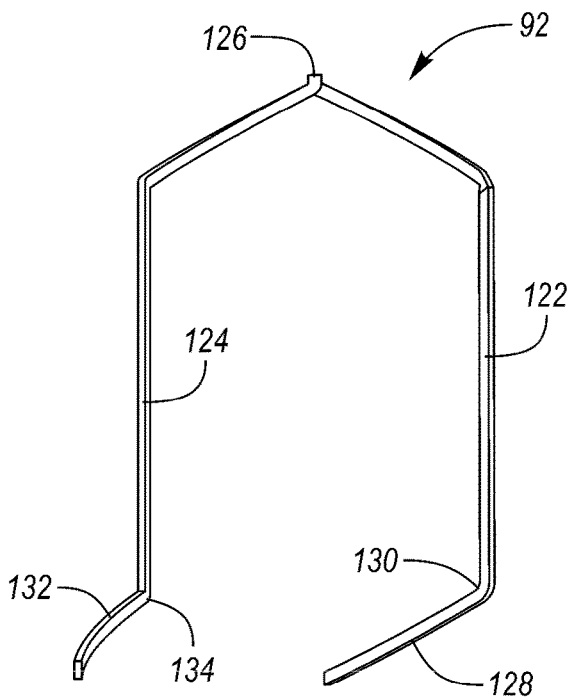
FIG. 4 is a front view of a turnaround pin.

Referring to FIG. 4, a turnaround pin 92 includes a first leg 122 and a second leg 124 joined at a vertex 126. The turnaround pin 92 is used to change the direction of the path, e.g., from clockwise to counterclockwise. The turnaround pin 92 may include a same span as the regular pins 9, which is nine slots in the illustrated embodiment. The shape of the turnaround pin 92 is similar to the regular pin 90 except the weld segments 128 and 132 extend in a same direction, i.e., the weld segment 128 may extend inward whereas the weld segment 132 extends outward, and the legs 122 and 124 are arranged to be in a same layer.

Figure 5:
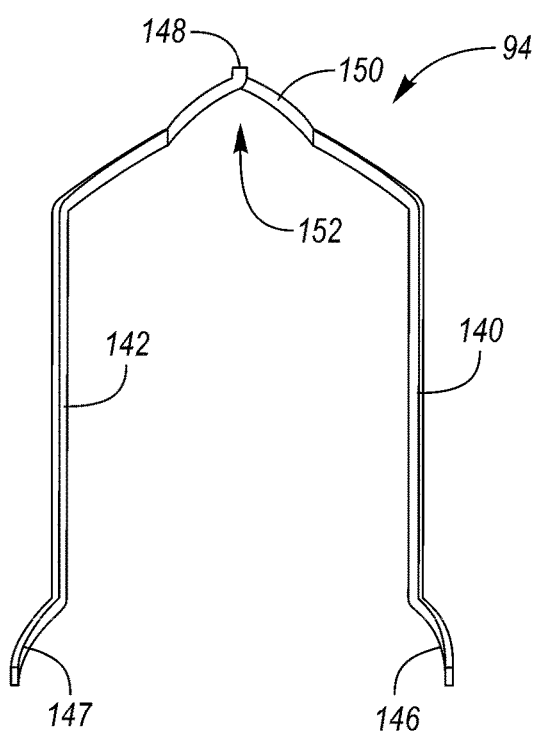
FIG. 5 is a front view of a carryover pin.

Referring to FIG. 5, a carryover pin 94 includes a first leg 140 and a second leg 142 joined at a vertex 148. The carryover pin 94 includes an arch portion 150 located near the vertex 148. The arch portion 150 creates a cavity 152 that allows one or more other pins to extend under the carryover pin 94 without contacting the carryover pin 94. The carryover pin 94 may have a span equal to the number of slots per pole (e.g., nine for the illustrated embodiment), plus the number of slots per pole per phase (e.g., three for the illustrated embodiment) minus one. In the illustrated embodiment, the carryover pins 94 have eleven slots. The carryover pin 94 may include weld segments 146 and 147 that extend outward from the pin similar to the regular pin 90.

Figure 6:
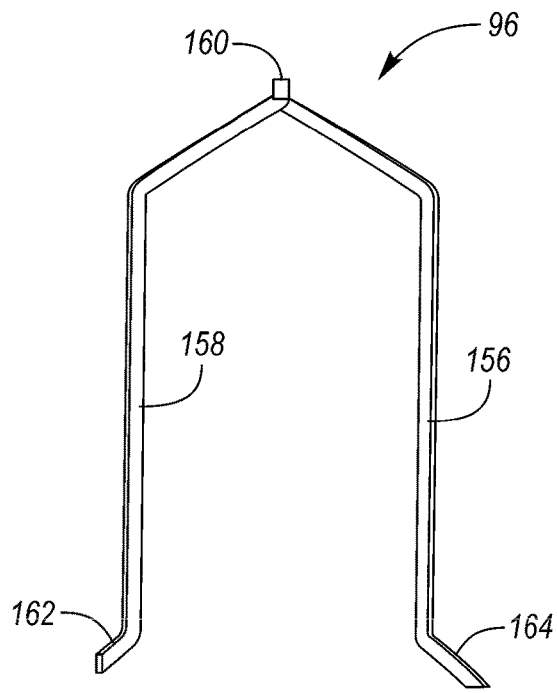
FIG. 6 is a front view of a short-pitch pin.

Referring to FIG. 6, a short-pitch pin 96 includes a first leg 156 and second leg 158 joined at a vertex 160. The short-pitch pin 96 may have a span that is one less than the regular pin 90, e.g., eight slots for the illustrated embodiment. The short-pitch pin 96 may include weld segments 162 and 164 that extend outward and away from each other.

Figure 8:
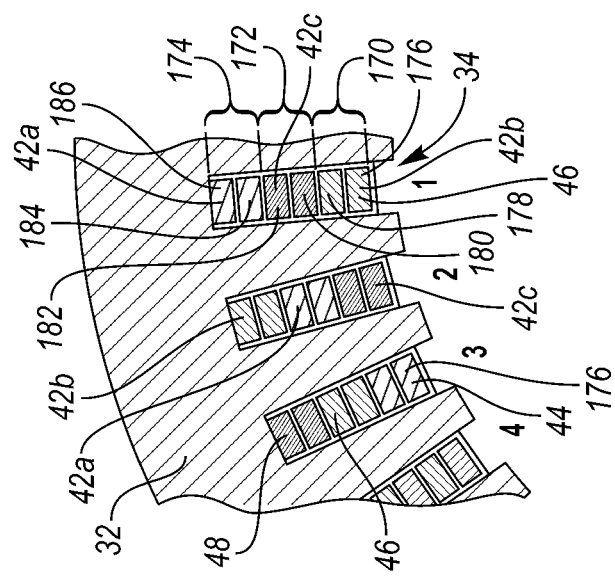
FIG. 8 is a magnified view of portion 8-8 of FIG. 7.
Figure 7:
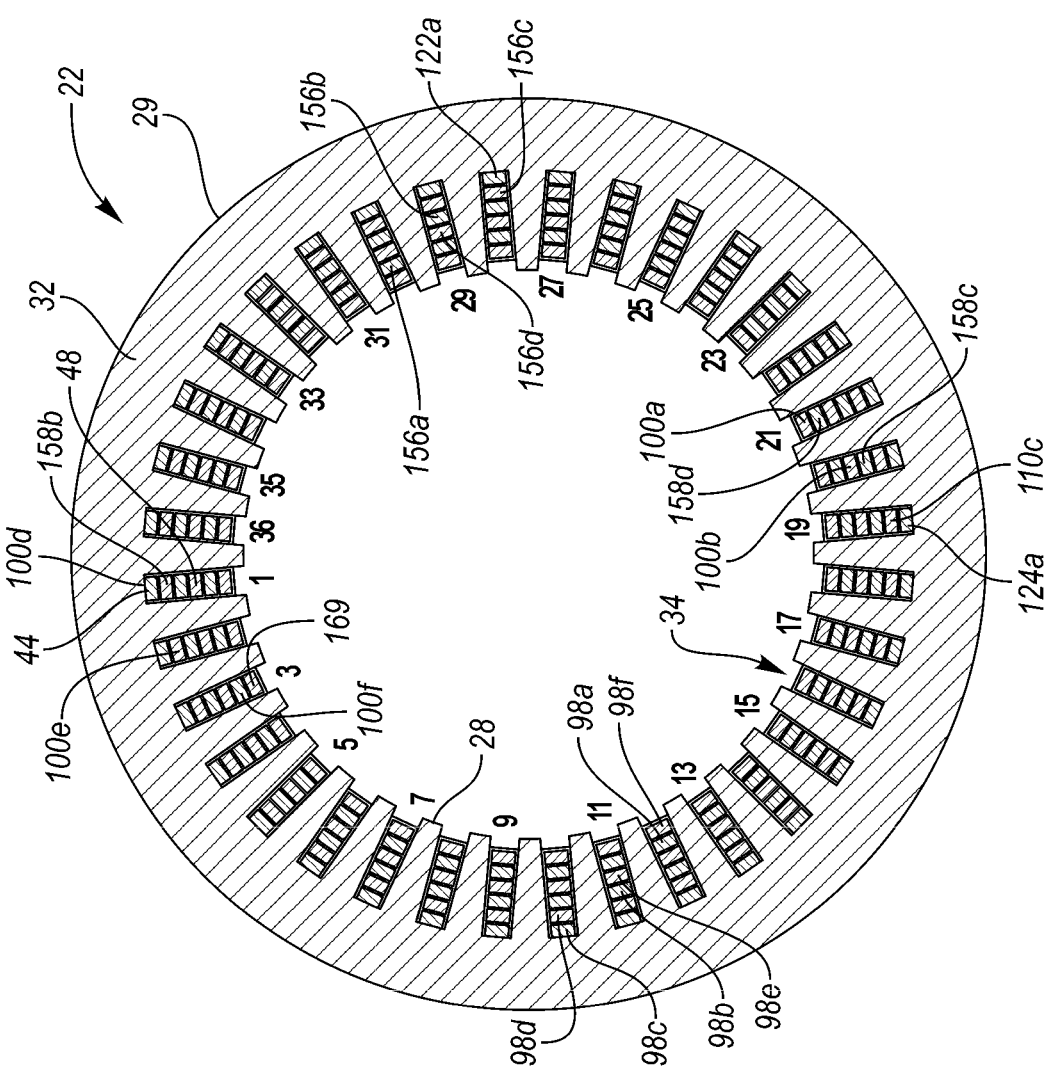
FIG. 7 is a cross-sectional view of the stator of FIG. 2 at cutline 7-7.

Referring to FIGS. 7 and 8, the slots 34 are arranged 1 through 36 in the counterclockwise direction with the odd number slots being labeled for convenience. The slots 34 may include an inner radial layer 170 of pins, a middle radial layer 172 of pins, and an outer radial layer 174 of pins. Each of the layers may include at least two radial positions that are adjacent to each other. In the illustrated embodiment, each slot 34 has six positions with the inner layer 170 including an inner position 176 and an outer position 178; the middle layer 172 including an inner position 180 and an outer position 182 of middle layer 172; and the outer layer 174 including an inner position 184 and outer position 186. The positions extend radially outward with the inner position 176 being adjacent to the inner diameter 28 of the stator core 32 and the outer position 186 of the outer layer 174 being nearest to an outer diameter 29 of the core 32. The positions may be sequential and in a one-by-six linear arrangement.

The electric machine 20 is balanced with each of the paths being configured to carry a same amount of current. Each of the paths occupies the inner and outer radial positions of each layer, e.g., path 44 has at least one pin 42a in each of the six positions with path 44 occupying the inner and outer positions 176, 178 of slot 3 of the inner layer 170, occupying the inner and outer positions 180, 182 of slot 2 of the middle layer 172, and occupying the inner and outer positions 184, 186 of slot 1 of the outer layer 174. In the illustrated embodiment, each path occupies each radial position four times. The paths are arranged so that, for each of the corresponding slots, the pins of a same path are in a same radial layer, e.g., layer 170. Referring to slot 3, for example, the first path 44 occupies both positions of the inner layer 170, the second path 46 occupies both positions of the middle layer 172, and the third path 48 occupies both positions of the outer layer 174.

The phases are arranged in groups to occupy sequential slots in each of the poles. In pole 1 (slots 1-9), for example, the U phase occupies slots 1-3, the V phase occupies slots 4-6, and the W phase occupies slots 7-9. The poles are balanced with each path occupying all of the radial layers a same number of the times, e.g., each path only occupies each radial layer once for each pole. The paths may contain a same number of pins in each of the layers 170, 172, 174. Turning to the U phase of pole 1 for example, each path 44, 46, 48 has two pins in each of the layers 170, 172, 174. In slot 1, path 44 has two pins 42a in the outer layer 174, path 46 has two pins 42b in the inner layer 170, and path 48 has two pins 42c in the middle layer 172. The locations of the paths switch slot-to-slot, and in slot 2, path 44 has two pins 42a in the middle layer 172, path 46 has two pins 42b in the outer layer 174, and path 48 has two pins 42c in the inner layer 170. In slot 3, the locations switch again and the first path 44 occupies the inner layer 170, the second path 46 occupies the middle layer 172, and the third path 48 occupies the outer layer 174. The other phases are similarly balanced. This arrangement creates substantially similar inductances for each path favoring a balanced sharing of the total current between the three paths, correcting a common shortcoming of other solutions.

Figure 9:
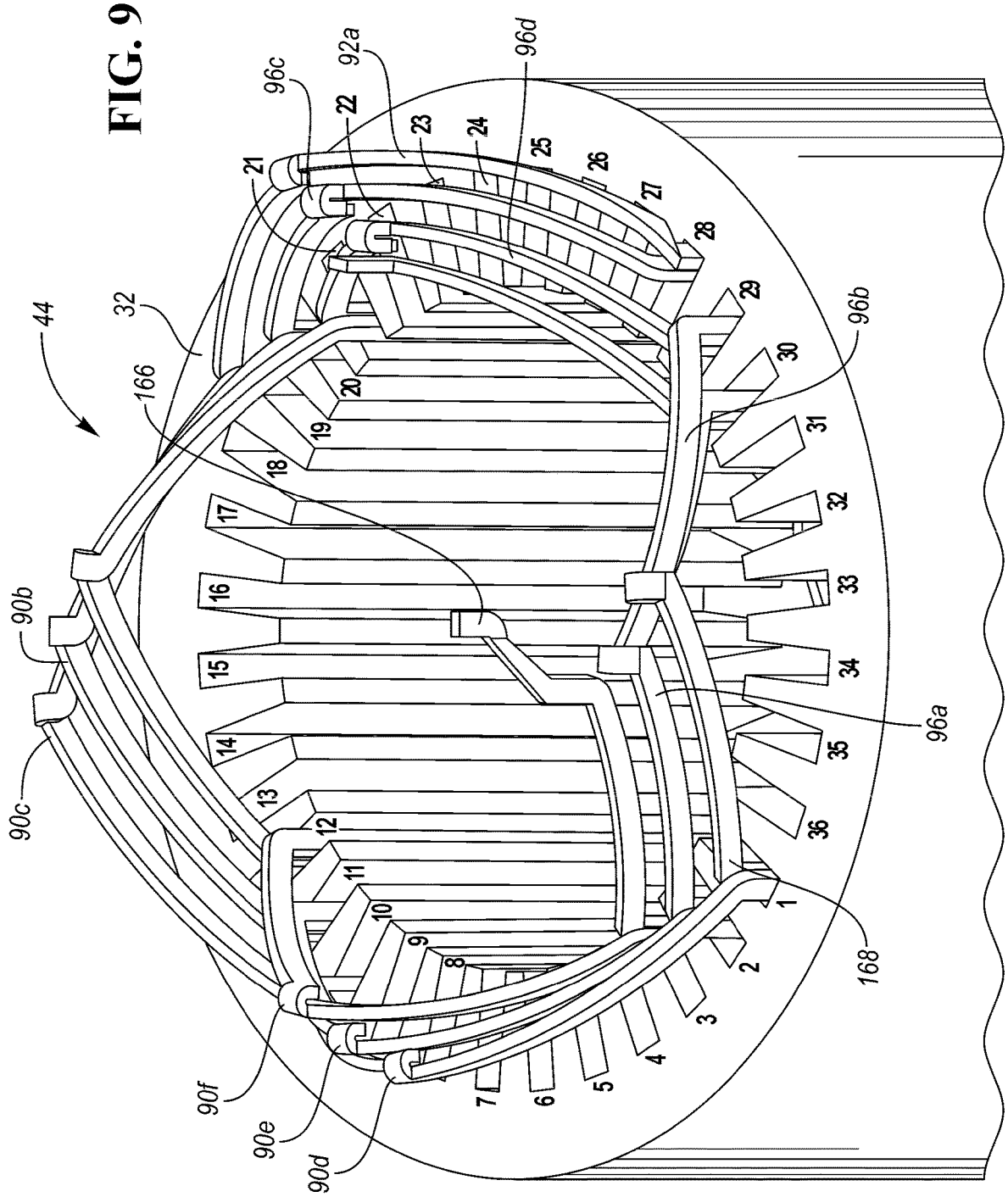
FIG. 9 is a perspective view of the stator showing a first winding path of the X phase and omitting the other winding paths for illustrative purposes.
Figure 10:
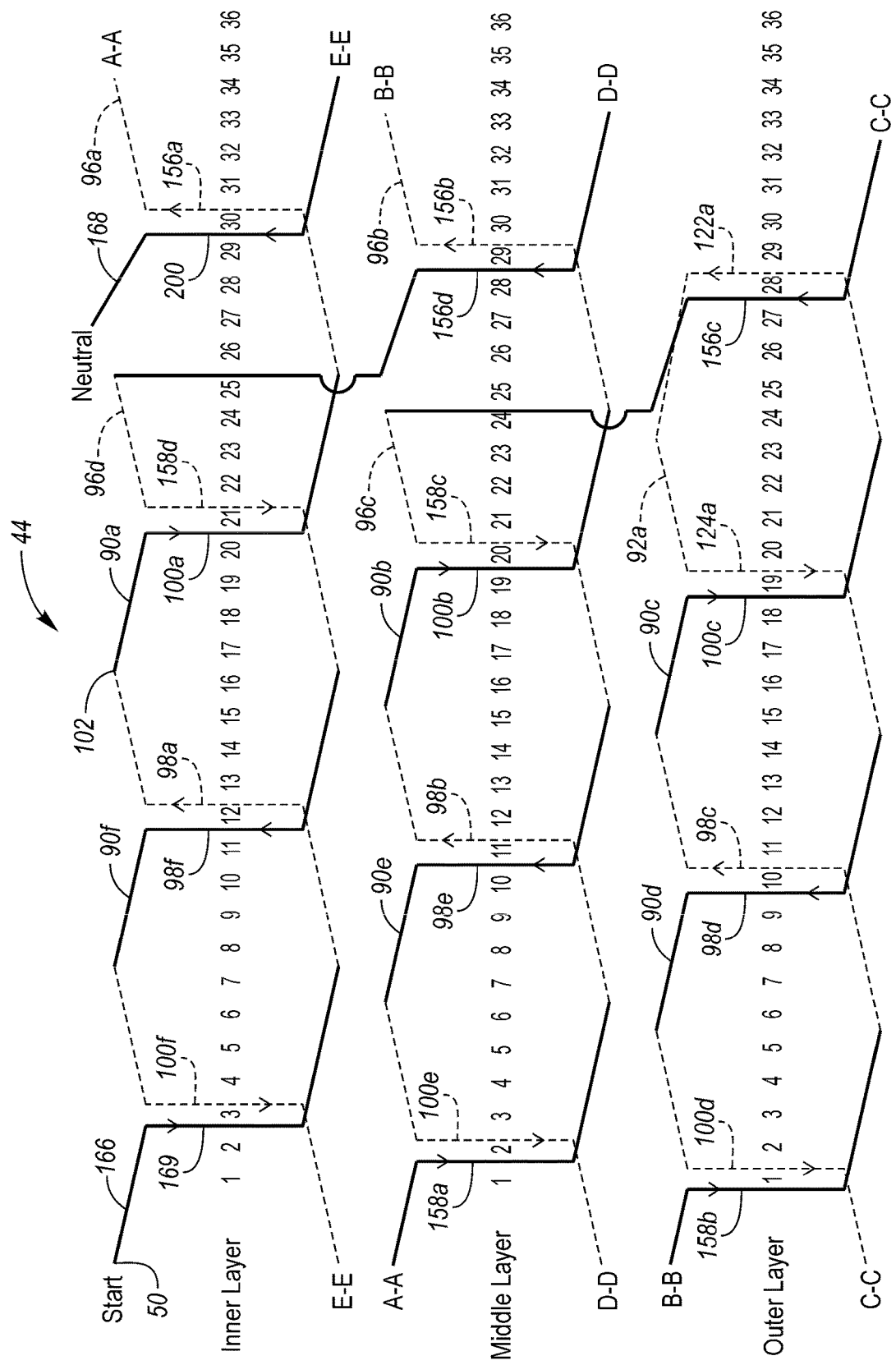
FIG. 10 is a winding diagram of the first winding path of the X phase.

Referring to FIGS. 7, 9, and 10, the first path 44 begins with a terminal pin 166 that only has a single leg 169 disposed in the inner position 176 of slot 3. (In FIG. 10, the solid lines signify the leg being in the outer slot position of the layer that the pin is in, and the dashed lines signify the leg being in the inner slot position of the same layer) The free end of pin 166 forms a portion of the terminal 50. The terminal pin 166 is attached to a regular pin 90a that has its first leg 98a disposed in the outer position 178 of the inner layer 170 of slot 12 and its second leg 100a disposed in the inner position 176 of slot 21. The pins may be arranged so that the terminals and the vertexes are disposed on the first end 36 and the pin connections are on the second end 38. The pins are typically welded or soldered together but other methods may be used to attach the weld segments of corresponding pins to each other.

The regular pin 90a is attached to a short-pitch pin 96a that has a first leg 156a disposed in the outer position 178 of slot 30 and a second leg 158a disposed in the inner position 180 of slot 2 of middle layer 172. The short-pitch pin 96a is attached to a regular pin 90b that has a first leg 98b disposed in the outer position 182 of the middle layer 172 of slot 11 and a second leg 100b disposed in the inner position 180 the middle layer 172 of slot 20. The regular pin 90b is attached to a short-pitch pin 96b that has a first leg 156b disposed in the outer position 182 of middle layer 172 of slot 29 and a second leg 158b disposed in the inner position 184 of the outer layer 174 of slot 1. The short-pitch pin 96b is attached to a regular pin 90c having a first leg 98c disposed in the outer position 186 of slot 10 of the outer layer 174 and a second leg 100c disposed in the inner position 184 of the outer layer 174 of slot 19. The regular pin 90c is joined to a turnaround pin 92a that reverses direction of the path 44.

The turnaround pin 92a has a first leg 122a disposed in the outer position 186 of the outer layer 174 of slot 28 and a second leg 124a disposed in the outer position 186 of the outer layer 174 of slot 19. The turnaround pin 92a may have both legs located in the outer position 186 of the outer layer 174, and may be the only type of pin that has both legs located in the same slot position. The turnaround pin 92a is attached to a regular pin 90d having a first leg 98d disposed in the inner position 184 of the outer layer 174 of slot 10 and a second leg 100d disposed in the outer position 186 of the outer layer 174 of slot 1. The regular pin 90d is attached to a short-pitch pin 96c having a first leg 156c disposed in the inner position 184 of the outer layer 174 of slot 28 and a second leg 158c disposed in the outer position 182 of the middle layer 172 of slot 20. The short-pitch pin 96c is attached to a regular pin 90e that has a first leg 98e disposed in the inner position 180 of the middle layer 172 of slot 21 and a second leg 100e disposed in the outer position 182 of the middle layer 172 of slot 2. The regular pin 90e is attached to a short-pitch pin 96d that has a first leg 156d disposed in the inner position 180 of the middle layer 172 of slot 29 and a second leg 158d disposed in the outer position 178 of slot 21. The short-pitch pin 96d is attached to a regular pin 90f that has a first leg 98f disposed in the inner position 176 of slot 12 and a second leg 100f disposed in the outer position 178 of slot 3. The regular pin 90f is attached to a neutral-connection pin 168 having a single leg 200 disposed in the inner position 176 of the inner layer 170 of slot 30. The neutral connection 52 is connected to a distal end of the pin 168.

Figure 11:
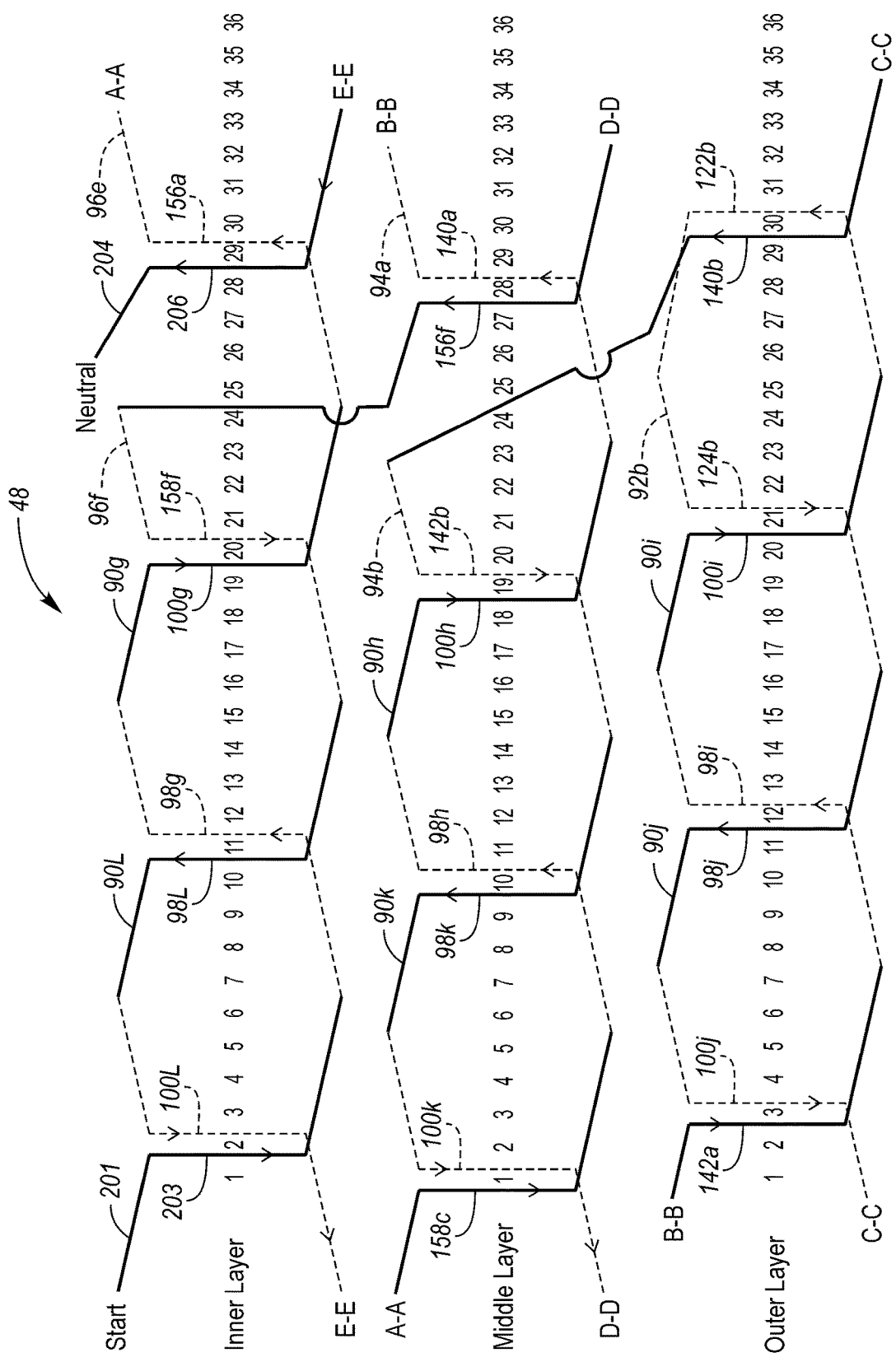
FIG. 11 is a winding diagram of a second winding path of the X phase.
Figure 12:
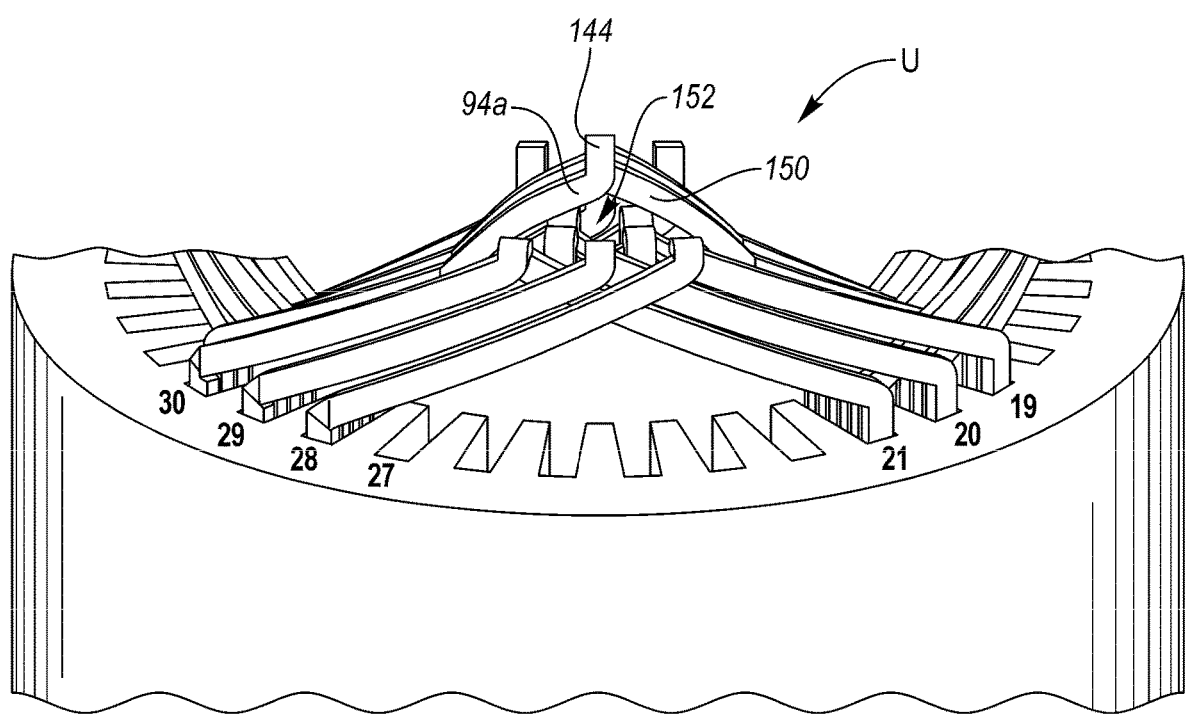
FIG. 12 is a perspective view of the stator showing the winding paths of the X phase and omitting the winding paths of the other phases for illustrative purposes.

Referring to FIGS. 7, 11, and 12, the second path 48 begins with a terminal pin 201 having a single leg 203 disposed in the inner position 176 of the inner layer 170 of slot 2. The terminal pin 201 is attached to a regular pin 90g having a first leg 98g disposed in the outer position 178 of slot 11 and a second leg 100g disposed in the inner position 176 of slot 20. The regular pin 90g is attached to a short-pitch pin 96e that has a first leg 156e disposed in the outer position 178 of slot 29 and a second leg 158e disposed in the inner position 180 of the middle layer 172 of slot 1. The short-pitch pin 96e is attached to a regular pin 90h that has a first leg 98h disposed in the outer position 182 of slot 10 and a second leg 100h disposed in the inner position 180 of slot 19. The regular pin 90h is attached to a carryover pin 94a having a first leg 140a disposed in the outer position 182 of slot 28 and a second leg 142a disposed in the inner position 184 of the outer layer 174 of slot 3. The carryover pin 94a has the arch portion 150 so that the carryover pin 94a can extend over others pins without contacting them. As can be seen in FIG. 12, two other pins are disposed in the cavity 152 of the arch portion 150. The carryover pin 94a is attached to a regular pin 90i that has a first leg 98i disposed in the outer position 186 of the outer layer 174 of slot 12 and a second leg 100i disposed in the inner position 184 of slot 21. The regular pin 90i is attached to a turnaround pin 92b having a first leg 122b disposed in the outer position 186 of the outer layer 174 of slot 30 and a second leg 124b disposed in the outer position 186 of the outer layer 174 of slot 21.

The turnaround pin 92b is attached to a regular pin 90j having a first leg 98j disposed in the inner position 184 of the outer layer 174 of slot 12 and a second leg 100j disposed in the outer position 186 of slot 3. The regular pin 90j is attached to a carryover pin 94b having a first leg 140b disposed in the inner position 184 of slot 30 and a second leg 142b disposed in the outer position 182 of middle layer 172 of slot 19. The carryover pin 94b is attached to a regular pin 90k that includes a first leg 98k disposed in the inner position 180 of middle layer 172 of slot 10 and a second leg disposed within the outer position 182 of middle layer 172 of slot 1. The regular pin 90k is attached to a short-pitch pin 96f having a first leg 156f disposed in the inner position 180 of slot 28 and a second leg 158f disposed in the outer position 178 of the inner layer 170 of slot 20. The short-pitch pin 96f is joined to a regular pin 90l that has a first leg 98l disposed in the inner position 176 of slot 11 and a second leg disposed in the outer position 178 of slot 2. The regular pin 90l is joined to a neutral-connection pin 204 having a leg 206 disposed in the inner position 176 of slot 29. The neutral connection 52 is attached to a distal end of the pin 204.

Figure 13:
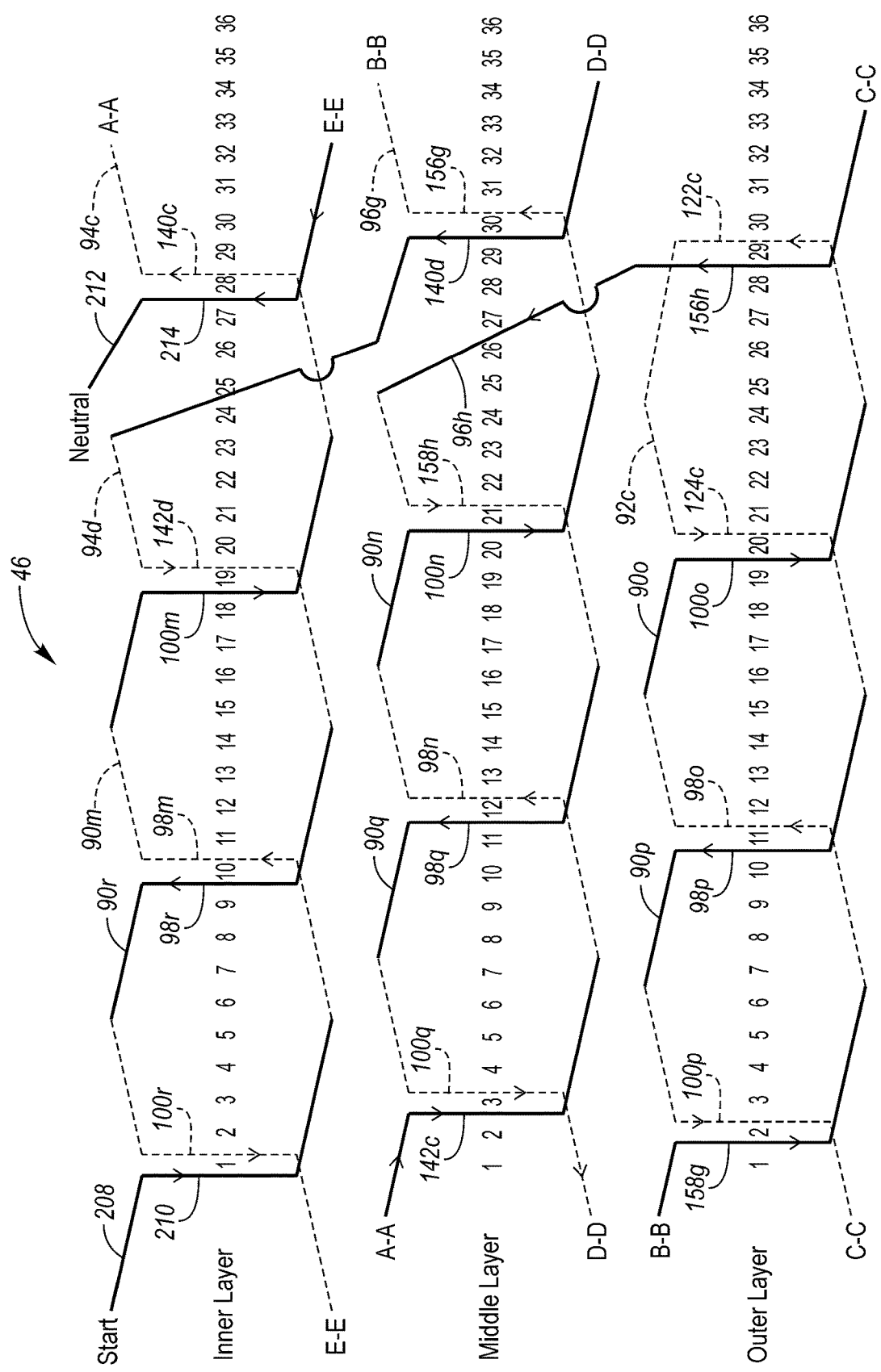
FIG. 13 is a winding diagram of a third winding path of the X phase.

Referring to FIGS. 7 and 13, the third path 46 begins with a terminal pin 208 having a single leg 210 disposed in the inner position 176 of the inner layer 170 of slot 1. The terminal pin 208 is attached to a regular pin 90m having a first leg 98m disposed in the outer position 178 of slot 10 and a second leg 100m disposed in the inner position 176 of slot 19. The regular pin 90m is attached to a carryover pin 94c having a first leg 140c disposed in the outer position 178 of slot 28 and a second leg 142c disposed in the inner position 180 of the middle layer 172 of slot 3. The carryover pin 94c is attached to a regular pin 90n having a first leg 98 disposed in the outer position 182 of slot and a second leg 100n disposed in the inner position 180 of slot 21. A short-pitch pin 96g is attached to the regular pin 90n having a first leg 156g disposed in the outer position 182 of slot 30 and a second leg 158g disposed in the inner position 184 of the outer layer 174 of slot 2. The short-pitch pin 96g is attached to a regular pin 90o having a first leg 98o disposed in the outer position 186 of slot 11 and a second leg 100o disposed in the inner position 184 of slot 20. The regular pin 90o is attached to a turnaround pin 92c having a first leg 122c disposed in the outer position 186 of the outer layer 174 of slot 29 and a second leg 124c disposed in the outer position 186 of the outer layer 174 of slot 20.

The turnaround pin 92c is attached to the regular pin 90p that has a first leg 98 disposed in the inner position 184 of the outer layer 174 of slot 11 and a second leg 100 disposed in the outer position 186 of slot 2. The regular pin 90p is attached to a short-pitch pin 96*h* having a first leg 156 disposed in the inner position 184 of slot 29 and a second leg 158 disposed in the outer position 182 of the middle layer 172 of slot 21. The short pitch pin 96*h* is attached to a regular pin 90*q* that has a first leg 98 disposed in the inner position 180 of slot 12 and a second leg 100 disposed in the outer position 182 of slot 3. The regular pin 90*q* is attached to a carryover pin 94*d* having a first leg 140*d* disposed in the inner position 180 of slot 30 and a second leg 142*d* disposed in the outer position 178 of the inner layer 170 of slot 19. The carryover pin 94*d* is attached to a regular pin 90*r* that has a first leg 98 disposed in the inner position 176 of slot 10 and a second leg 100*r* disposed in the outer position 178 of slot 1. The regular pin 90*r* is attached to a neutral-connection pin 212 that has a single leg 214 disposed in the inner position 176 of slot 28.

The paths of V and W phases are wound in a similar manner except shifted from the U phase by the number of slots per phase, in the present example these are three and six slots, respectively.

In the illustrated embodiment, current always enters through the inner position 176 of the inner layer 170 and exits through the inner position 176 of the inner layer 170 so that the terminals 50, 64, 78 and the neutral connection 52 are located on the inside of the end windings. This is to facilitate the construction of the turnaround pin which needs to be bent outward (or inward) to avoid encroachment with other pins. There is more room near the outer yoke of the stator than there is near the gap. However, one skilled in the art will realize that this same arrangement can be flipped and be described to have the phase and neutral connections on the outer-most position 186 and the turnaround pin on the inner most position 176.

The above described windings present an efficient design in which the weld segments of connected pins are adjacent to each other to simplify attachment. Since the weld segments of the connected pins are adjacent to each other, the pins can be directly connected without the need for jumpers (or other intermediary conductor) to connect the pins. This reduces the complexity of assembly and material costs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
a stator defining slots grouped into poles; and
a plurality of hairpins interconnected with select ones of the hairpins to form a plurality of winding paths corresponding to one of three phases of the electric machine and being configured to carry a same amount current, wherein each of the paths is disposed in corresponding ones of the slots, wherein the slots include radial layers of the hairpins that each have at least radially adjacent inner and outer hairpins positions, and, for each of the poles, each of the paths occupies the inner and outer hairpin positions of each of the layers once, and wherein the hairpins include a regular hairpin spanning nine slots, a short-pitch hairpin spanning eight slots, and a carryover hairpin spanning eleven slots.

2. The electric machine of claim 1, wherein each of the slots only includes paths of the same phase.

3. The electric machine of claim 2, wherein all of the paths of the phase are in common ones of the slots.

4. The electric machine of claim 1, wherein the radial layers include an inner layer, a middle layer, and an outer layer, and wherein the hairpins include legs disposed in the slots such that, for each of the paths, each of the inner, middle, and outer layers has a same number of legs.

5. The electric machine of claim 1, wherein the winding paths includes three winding paths, and six of the pins are disposed in each of the slots with two of the six hairpins being associated with each of the three winding paths.

6. An electric machine comprising:
a stator core defining slots having radial layers that each include radially adjacent first and second pin positions; and
pins disposed in corresponding ones of the slots and interconnected to form a winding path, wherein the path occupies the first and second positions of each of the layers, and, for each of the corresponding slots, the pins are in a same layer, wherein the pins include a first type of pin having a first leg disposed in a first one of the corresponding slots and a second leg disposed in a second one of the corresponding slots that is spaced apart from the first one by a first span of slots, and a second type of pin having a first leg disposed in a third one of the corresponding slots and a second leg disposed in a fourth one of the corresponding slots that is spaced apart from the first one by a second span of slots that is less than the first span, wherein the first and second legs of the first type are disposed in a same layer, and the first and second legs of the second type are disposed in different layers.

7. The electric machine of claim 6, wherein each of the pins includes a first leg disposed in a first one of the corresponding slots and a second leg disposed in a second one of the corresponding slots that is spaced apart from the first one by a span of slots.

8. The electric machine of claim 7, wherein the pins include at least first, second, and third types of pins, and the span of each of the types is different.

9. The electric machine of claim 8, wherein the first type of pin has a span of nine slots, the second type of pin has a span of eight slots, and the third type of pin has a span of eleven slots.

10. The electric machine of claim 9, wherein the third type of pin includes an arch portion that defines a cavity, and wherein at least one of pins is disposed in the cavity.

11. The electric machine of claim 6, wherein each of the pins includes a pair of first and second legs that are bent to form first and second weld segments, and wherein the pins include regular pins that are bent so that the first and second weld segments extend in opposite directions, and a turnaround pin that is bent so that the first and second weld segments extend in a same direction.

12. The electric machine of claim 11, wherein one of the first and second weld segments of the turnaround pin is welded to one of the first and second weld segments of a corresponding one of the regular pins.

13. The electric machine of claim 6 further comprising:
second pins disposed in the corresponding ones of the slots and interconnected to form a second winding path, wherein the second path occupies the first and second pin positions of each layer, and, for each of the corresponding slots, the pins are in a same layer; and
third pins disposed in the corresponding ones of the slots and interconnected to form a third winding path, wherein the third path occupies the first and second positions of each layer, and, for each of the corresponding slots, the pins are in a same layer.

14. The electric machine of claim 13, wherein each of the winding paths are configured to pass a same amount of current therethrough.

15. The electric machine of claim 13, wherein the path, the second path, and the third path has a same number of pins.

16. A stator for an electric machine comprising:
a stator core defining slots circumferentially arranged and extending radially outward from an inner diameter of the core; and
a plurality of hairpins interconnected with select ones of the hairpins and disposed in corresponding ones of the slots to form a plurality of winding paths each corresponding to one of three phases of the electric machine and configured to pass a same amount of current therethrough, wherein the slots include radial layers of the hairpins that each have at least radially adjacent outer and inner hairpins positions, and wherein each of the paths occupies the outer and inner positions of each layer of the corresponding ones of the slots, and, for each of the corresponding slots, the hairpins are in a same layer, and wherein each of the paths occupy all of the radial layers a same number of the times, wherein the hairpins include at least first, second, and third types of hairpins, and the first type of hairpins has a span of nine slots, the second type of hairpins has a span of eight slots, and the third type of hairpins has a span of eleven slots.

17. The stator of claim 16, wherein each of the hairpins includes a first leg disposed in a first one of the corresponding slots and a second leg disposed in a second one of the corresponding slots that is spaced apart from the first one by a span of slots.

* * * * *